| United States Patent [19] | [11] Patent Number: 4,605,037 |
|---|---|
| Rabinovich | [45] Date of Patent: Aug. 12, 1986 |

[54] LIQUID OVERFILL PROTECTION SYSTEM

[75] Inventor: Joshua E. Rabinovich, Newton, Mass.

[73] Assignee: RCR Industries, Inc., Boston, Mass.

[21] Appl. No.: 684,480

[22] Filed: Dec. 21, 1984

[51] Int. Cl.$^4$ ............................................. F16K 21/18
[52] U.S. Cl. ..................................... 137/390; 137/393
[58] Field of Search ................ 137/390, 393; 141/209; 251/356

[56]  References Cited
U.S. PATENT DOCUMENTS

| 3,101,101 | 8/1963 | Gearhart et al. | 141/209 X |
| 3,174,518 | 3/1965 | Klaus | 137/390 X |
| 3,433,249 | 3/1969 | Nelson | 137/390 |
| 4,454,896 | 6/1984 | Barret, Jr. et al. | 141/209 |

Primary Examiner—Stephen Marcus
Assistant Examiner—Mark Thronson
Attorney, Agent, or Firm—Bromberg, Sunstein & McGregor

[57]  ABSTRACT

A liquid overfill protection system uses an arrangement for delivering a fluid, such as air, to first and second outlets with a pressure difference that is indicative of the extent to which the tank has been filled with liquid. The system includes a control arrangement for closing a valve when the difference in fluid pressure between the first and second outlets exceeds a predetermined level. In this manner, liquid flow into the tank may be blocked when the tank has been filled to a desired extent. In a preferred embodiment, a diaphragm mounted in the valve assembly is used to trigger release of the valve into a closed position when a sufficient pressure differential exists.

4 Claims, 7 Drawing Figures

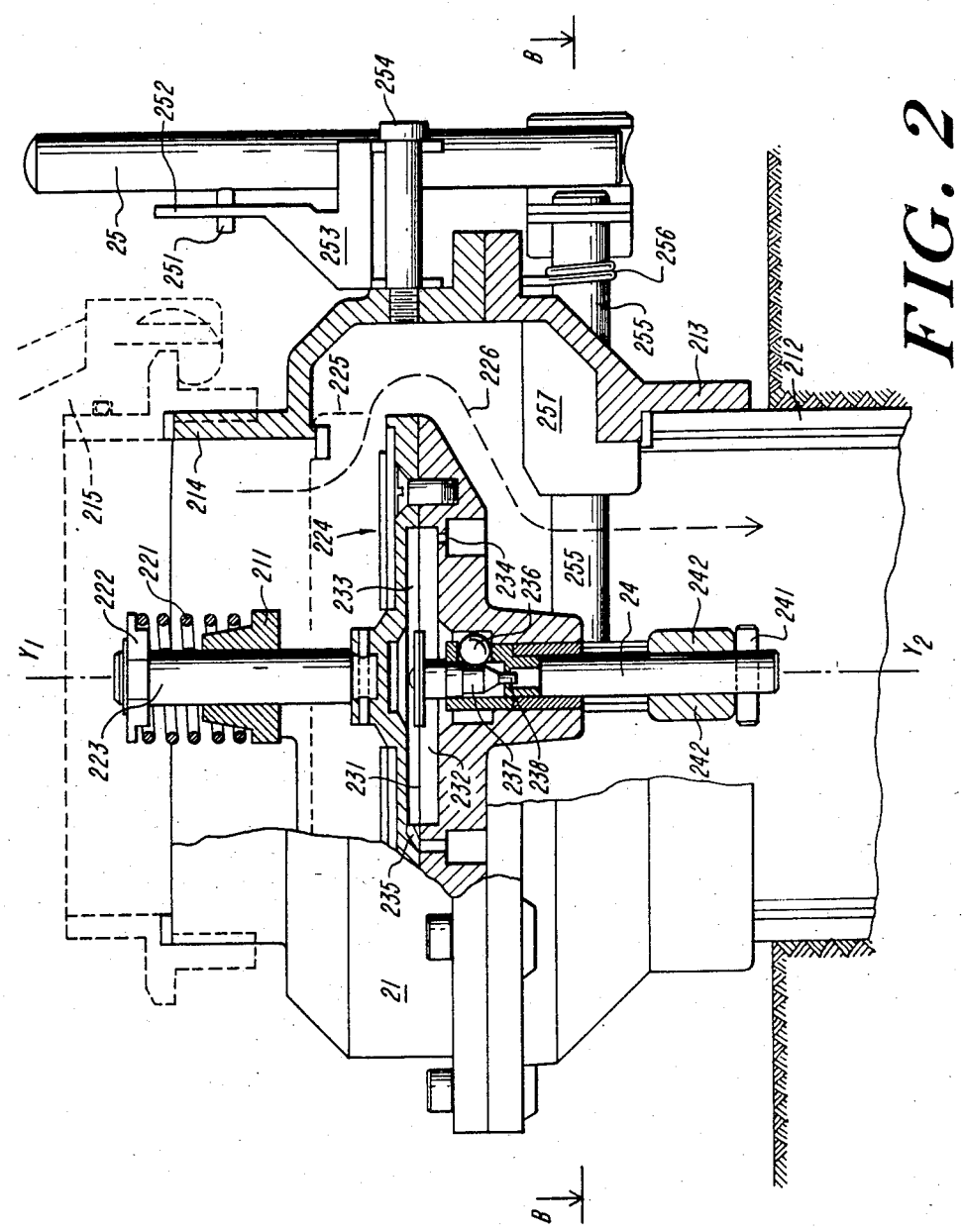

LIQUID OVERFILL PROTECTION SYSTEM

DESCRIPTION

1. Technical Field

The present invention relates to devices for preventing the overfill of liquid storage tanks, such as underground tanks that are commonly used for the storage of fuel in gasoline stations.

2. Background Art

Overfill protection devices are known in the art. One class of devices utilizes a venturi system to sense change in fluid flow through a nozzle of a liquid dispensing device commonly used for dispensing gasoline to the tanks of motor vehicles and is disclosed in U.S. Pat. No. 3,877,480. The foregoing patent also discloses a vacuum-driven diaphragm arrangement to shut off flow through the nozzle. I have found that venturi-operated systems are unreliable where the flow is through a relatively large diameter conduit at low pressure.

DISCLOSURE OF INVENTION

The present invention uses an arrangement for delivering a fluid, such as air, to first and second outlets with a pressure difference that is indicative of the extent to which the tank has been filled with liquid. The system includes a control arrangement for closing a valve when the difference in fluid pressure between the first and second outlets exceeds a predetermined level. In this manner, liquid flow into the tank may be blocked when the tank has been filled to a desired extent. In a preferred embodiment, a diaphragm mounted in the valve assembly is used to trigger release of the valve into a closed position when a sufficient pressure differential exists.

BRIEF DESCRIPTION OF THE DRAWINGS

These and other features of the invention will be more readily understood by consideration of the following detailed description taken with the accompanying drawings, in which:

FIG. 2 is a vertical section of a preferred embodiment of the invention as mounted on a fill tube;

DESCRIPTION OF SPECIFIC EMBODIMENTS

Figure 1:
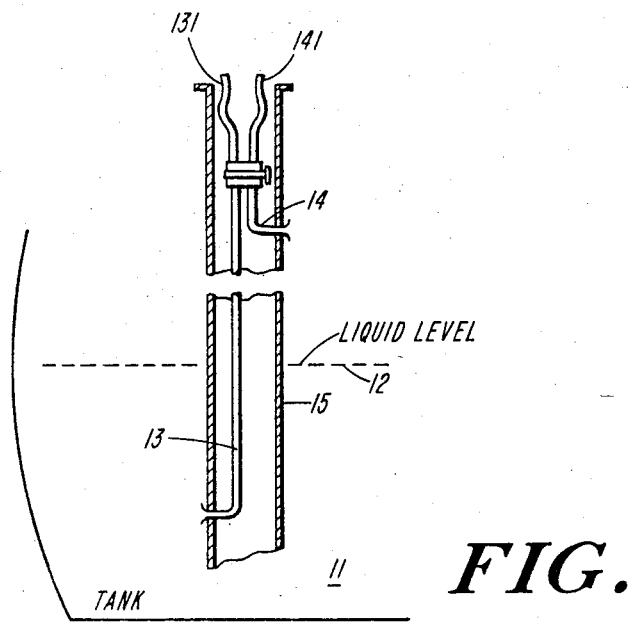
FIG. 1 is a vertical section of a tank for holding liquid in which the present invention may be applicable and showing placement of a sensing arrangement in the tank's fill tube.

FIG. 1 presents a vertical section of a tank 11 for holding liquid in which the present invention may be applicable. The tank includes a fill tube 15 through which a liquid such as gasoline or other fuel is supplied to fill the tank. In typical applications, the tank is underground, and the fill tube is accessed beneath a manhole cover. In accordance with a preferred embodiment of the invention, the fill tube is shown here equipped with pipes 13 and 14 to which are attached flexible tubes 131 and 141, respectively. Pipe 14 is preferably located so that its unconnected end is vented to the atmosphere in the tank and not reached by the maximum height of liquid in the tank. Conversely, the unconnected end of pipe 13 is vented into a location suitably low in the tank, so that the pressure of air in the pipe 13 is a function of the fluid level in the tank. It will be apparent from the foregoing that if tubes 131 and 141 are suitably connected, the difference in pressure in the respective tubes is a function of the extent to which the tank 11 is filled with liquid.

The present invention employs the foregoing difference in pressure to close a valve at the mouth of the fill tube when the liquid has reached a predetermined level in the tank. FIG. 2 shows the manner in which a preferred embodiment of the invention accomplishes this result. The top of the fill tube 15 of FIG. 1 is identified in FIG. 2 as item 212. The automatic shut-off assembly is placed in a housing 21 and forms a relatively short extension of the fill tube. In particular the outlet end 213 is placed over the fill tube end 212, and is connected in the same manner as if the outlet end 213 were a normal hose connection. The inlet end 214 of the assembly is therefore equipped to receive a connection with a hose, which is shown in phantom as item 215.

Prior to commencement of the fill operation, lever 25 is used to pull valve assembly 224 into an open position. The valve assembly 224 is here shown in an open position, and provides a flow path 226 for fluid to flow around the valve from the inlet end 214 of the assembly through the outlet end 213 and into the fill tube 212.

When the valve assembly is in a closed position, the valve assembly moves up to the position shown in phantom as item 225 in FIG. 2. The valve assembly 224 is rigidly attached to stem 223. The stem 223 in turn passes through bushing 211, which is mounted to the housing 21. An end cap 222 on stem 223 receives a valve return spring 221, which applies an upward force on the end cap relative to the bushing 211 and the housing. Consequently, if the valve assembly 224 were not otherwise restrained, it would be forced by the return spring 221 into the closed position indicated by item 225. However, rod 24, which emanates from the lower portion of the valve assembly 224, is used to pull and hold the assembly 224 in an open position during the normal fill operation.

In particular, during a fill operation, the rod 24 is secured from moving relative to the valve assembly 224. Lever 25 is used to rotate torque shaft 255, which rotates within bushing 257; the torque shaft 255, in turn, causes yoke 242, in a manner described in further detail below in connection with FIG. 3, to move down. The downward motion of yoke 242 is against nut 241 so as to cause rod 24 to move down. (nut 241 is further secured with luck pin 243) When lever 25 has been moved a sufficient distance, a pin 251 protruding from it engages in a suitable slot in the tip 252 of latch 253. Latch 253 is spring loaded about the latch hinge 254, in such a way that the latch will be released from engagement with the pin in the event that lever 25 no longer experiences force from valve return spring 221 as coupled through the valve assembly 224, rod 24, and torque shaft 255. In any event, as long as rod 24 is maintained in fixed spatial relationship with respect to valve assembly 224, the latch 253 and pin 251 will keep the valve assembly held in an open position.

Rod 24, however, is held in fixed relation to the valve assembly 224 only by virtue of catch ball 236, which protrudes through an opening in the rod and engages against an edge of the valve assembly 224. The catch ball 236 is maintained in this position by release pin 237. The release pin 237 is in turn mechanically connected to the diaphragm 231, which is located in an enclosure within the valve assembly 224. The diaphragm causes the enclosure to be divided into an upper chamber 233 and a lower chamber 232. The upper chamber is connected through upper inlet 235 to port b, which, in turn, is connected to the end of tube 141 in FIG. 1. The lower chamber is connected through lower inlet 234 to port a, which in turn is connected to the end of tube 131 in FIG. 1. When the pressure in port a is sufficiently greater (owing to increasing level of liquid in the tank 11) than the pressure in port b, the diaphragm moves in an upward position, causing release pin 237 to rise until pin tip 238 is opposite the catch ball, leaving room for it to move until it is substantially within the profile of rod 24, and permitting the valve assembly 224 to move upward with respect to rod 24. Accordingly, the valve assembly is pushed in an upward position by valve return spring 221 pushing against end cap 222 of stem 223. Thus, valve assembly 224 moves to closed position 225. Furthermore, because rod 24 is no longer under tension, the spring of latch 253 causes the latch to be disengaged from pin 251, permitting the lever return spring 256 to move the lever toward its former uncocked position.

The lever return spring 256 also, of course, causes rotation of the torque shaft 255, and therefore pushes yoke 242 upward. The yoke 242 engages against a shoulder on rod 24 so as to push the rod 24 back to the position it formerly occupied in relation to valve assembly 224.

Furthermore, when the difference in air pressure in port a and b is made suitably smaller, as by reduction in the level of liquid in the tank 11, the diaphragm 231 will revert to its former position, driving release pin 237 downward so that the pin tip 238 proceeds beyond catch ball 236 and the body of release pin 237 is engaged against the catch ball, forcing it outwardly beyond the profile of rod 24 into a portion of the valve assembly 224, so that the rod is again engaged statically with respect to the valve assembly 224. The lever 25 may therefore be used again to lower valve assembly 224 and open the system for refilling of the tank.

Figure 3:
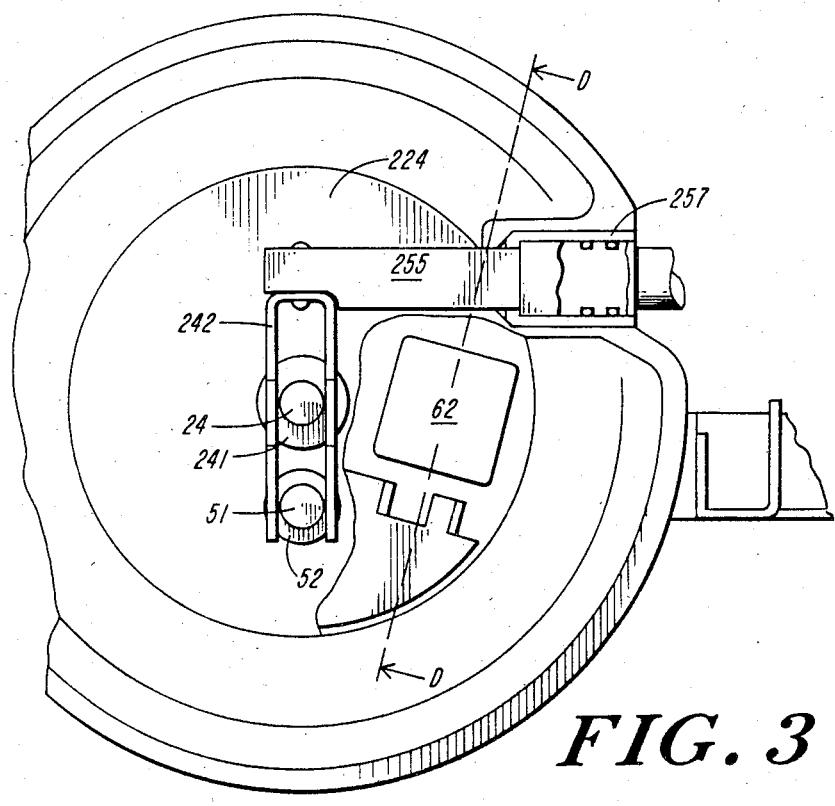
FIG. 3 shows a cross section at plane B—B of FIG. 2.

FIG. 3 is a cross section through plane B—B of FIG. 2, and is shown in a view from above the plane. The torque shaft 255 is shown here extending through bushing 257; the end of the torque shaft is connected to yoke 242. Downward motion of rod 24 is accomplished by pushing on nut 241. As will be discussed in further detail in connection with FIG. 5, the yoke 242 also straddles a stud 51 projecting downwardly from the valve assembly 224 and may be engaged under appropriate circumstances against end piece 52 on the stud. FIG. 3 also shows dipstick door 62 in the valve assembly 224; the dipstick door is in fact in the upper surface of the valve assembly and not in plane B—B, but is shown here to indicate its relative location in the cross section.

Figure 4:
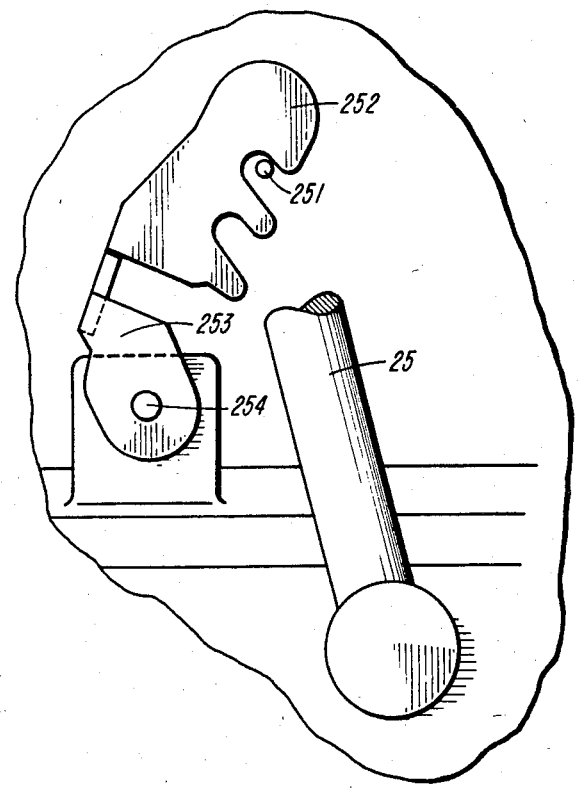
FIG. 4 shows detail of the latch and lever assembly shown in FIG. 2.

FIG. 4 shows detail of the latch 253, which rotates on hinge 254, so that the latch tip 252 may engage against pin 251 on lever 25.

Figure 5:
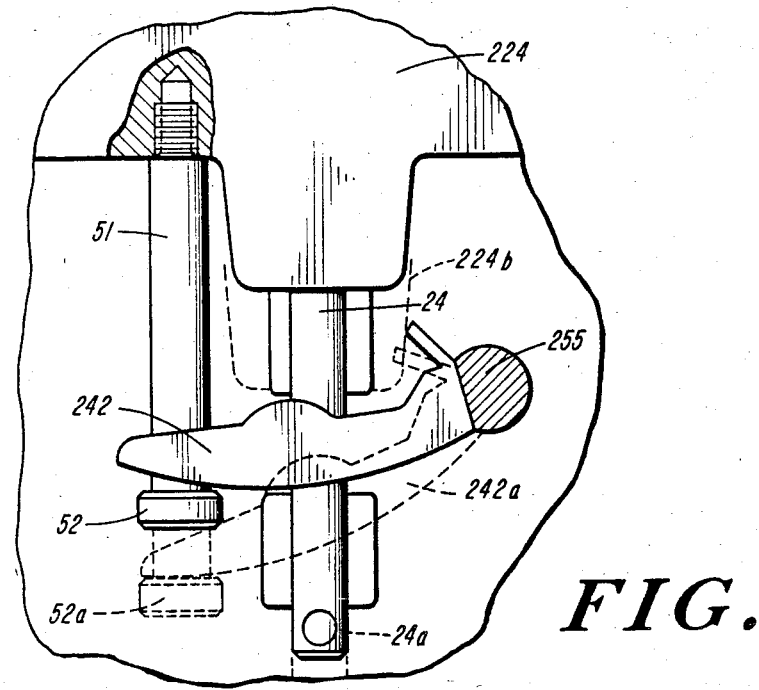
FIG. 5 shows further detail of the yoke and rod assembly shown in FIG. 3.

In FIG. 5 it is shown how the valve may be manually opened after it has been closed by the automatic overfill action described above. In an application such as for protecting against overfill of underground fuel tanks, there may be fuel remaining in the hose used for filling the tank after automatic closing of the valve has occurred. Under such circumstances, it is desirable to provide a means to open the valve manually to permit fuel to drain from the hose into the tank. In normal operation as described above, yoke 242 never touches end pieces 52 on stud 51. However, when the valve has closed automatically by an overfill condition, the valve assembly moves from the position shown in phantom as 224b to the position shown in solid as item 224. Under such circumstances, the lever 25 may be used to rotate torque shaft 255 (by moving the lever in the override position) to cause yoke 242 to engage against end piece 52. Further motion of the lever 25 in the same direction will cause the yoke 242 to pull the stud 251 in a downward direction until the yoke and end piece occupy the positions shown in phantom as items 242a and 52a respectively; but motion of the end piece in this direction means that the entire valve assembly 224 has been moved downward, and thus the valve may be manually opened by lever 25.

Figure 6:
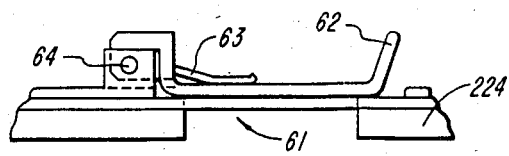
FIG. 6 presents a vertical section through D—D shown in FIG. 3 and gives detail concerning the dipstick door in the valve assembly of FIG. 3.

FIG. 6 shows a cross section of the assembly involving the dipstick door 62 of FIG. 3. The dipstick door closes an aperture 61 in the entire valve assembly 224. The aperture 61 permits insertion of the dipstick through the valve assembly into the tank. The door 62 is on the top surface of the valve assembly and opens upward by rotation about a hinge 64. A spring 63 hold the door 62 engaged against the valve assembly. The geometry of the door is such that the fluid pressure in the filling hose tends to force the door 62 closed.

Figure 7:
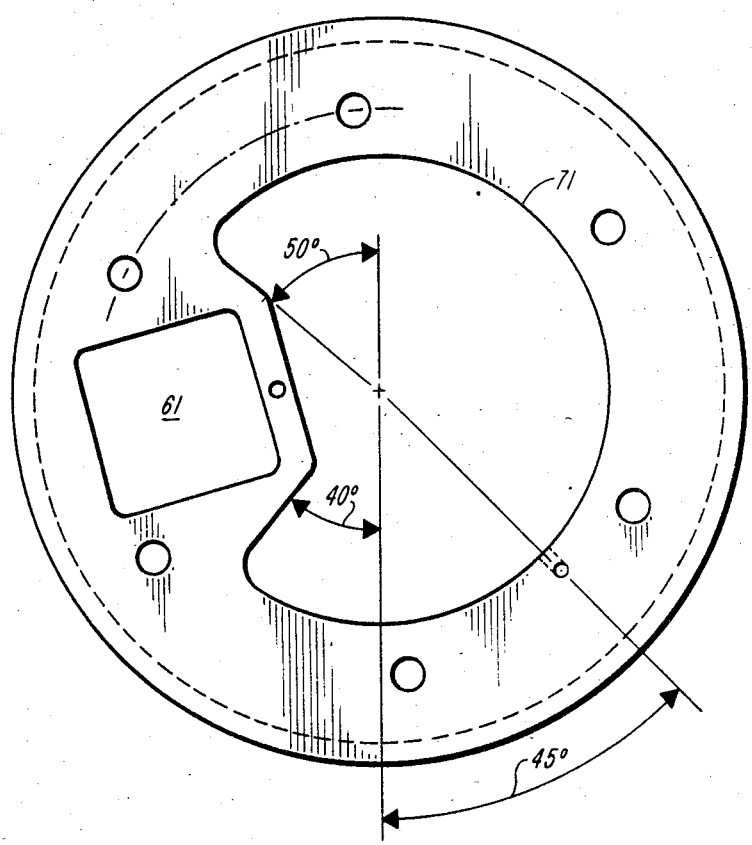
FIG. 7 shows the geometry of diaphragm 231 of FIG. 2.

In order to accommodate the aperture 61 in the valve assembly, the diaphragm 231 of FIG. 2 is designed to be nonsymmetrical, as shown in FIG. 7. In this figure, the operative area of the diaphragm is shown as item 71, and the aperture 61 is shown in relation thereto.

Accordingly, while the invention has been described with particular reference to specific embodiments thereof, it will be understood that it may be embodied in a variety of forms diversed from those shown and described without departing from the spirit and scope of the invention as defined by the following claims.

What is claimed is:

1. A system for preventing a liquid storage tank that is filled through an inlet, via a liquid flow path into the tank, from becoming filled beyond a desired level, the system comprising:

pressure means for delivering to first and second outlets fluid with a pressure difference therebetween that is indicative of the extent to which the tank has been filled with liquid;

valve means, in communication with the inlet, for permitting or blocking, according as the valve means is moved into an open or closed position respectively, the liquid flow path through the inlet into the tank, such valve means including a valve member movable along a central axis and having a reclosable aperature therein for insertion of a dip stick therethrough; and control means, having ports in communication with the first and second outlets, for moving the valve means into a closed position when the fluid pressure difference between the first and second outlets exceeds a predetermined level, so that the liquid flow into the tank is blocked when the tank has been filled to the desired level, such control means further including (i) an enclosure having first and second regions in communication with the first and second outlets respectively, (ii) a diaphragm, displaceable by a relative difference in fluid pressure existing on each side thereof, so located in the enclosure as to form a fluid-tight separation of the first and second regions into first and second chambers, and (iii) actuation means, for moving the valve means into a closed position when displacement of the diaphragm by the fluid pressure difference thereon exceeds a predetermined limit, wherein (a) the diaphragm and first and second chambers are included in the valve member, and (b) the first and second chambers are so located that there is no communication from either of them to the reclosable aperature.

2. A system according to claim 1, wherein the diaphragm has approximately radial symmetry for at least $\pi$ but less than $2\pi$ radians of arc around an axis of symmetry and the reclosable aperture is located within the balance of the arc.

3. A system according to claim 1, wherein the system further includes override means for manually moving the valve means into an open position after the actuation means has moved the valve means into a closed position, so that fluid remaining in a hose connected to the inlet may be drained into the tank after the tank has been filled to a desired extent.

4. A system according to claim 3, wherein (a) the actuation means includes (i) a spring for loading the valve means in the closed position, (ii) means including a lever having a first position for manually causing the releasable engagement of the valve means in an open position against the load of the spring, and (iii) release means actuated by the diaphragm for releasing the engagement of the valve means in the open position so as to permit the spring to move the valve means to the closed position; and (b) the override means includes means effected by movement of the lever to a second position for manually moving the valve means into an open position after the actuation means has moved the valve means into a closed position.

* * * * *